Patented May 9, 1950

2,507,472

UNITED STATES PATENT OFFICE 2,507,472

THIOCYANOACETATE DERIVATIVE OF 4-VINYLCYCLOHEXENE

Herbert L. Johnson, Media, and Archibald P. Stuart, Norwood, Pa., assignors to Sun Oil Company, Philadelphia, Pa., a corporation of New Jersey No Drawing. Application August 19, 1947, Serial No. 769,540

3 Claims. (Cl. 167—30)

This invention relates to a novel derivative of 4-vinylcyclohexene and to a novel insecticide. More particularly it relates to the preparation of a thiocyanoacetate derived from 4-vinylcyclohexene and to the product thus obtained as well as to its use as an essential active ingredient in an insecticidal composition of matter.

In copending application Serial No. 636,510, filed December 21, 1945, by Frances J. Bondhus and H. L. Johnson, now abandoned, and continuation-in-part application Serial No. 778,270, filed October 6, 1947, there is described and claimed the product obtained upon esterification of vinylcyclohexene. Specifically there is disclosed and claimed in said continuation-in-part application the chloroacetic acid ester product obtained by adding 4-vinylcyclohexene to a solution of monochloroacetic acid, chloroform, and boron trifluoride diethyl ether complex. Another method for preparing the monochloroacetate consists in adding fairly concentrated sulfuric acid to a solution of 4-vinylcyclohexene and monochloroacetic acid. In each case heat is required for completion of the reaction. Examples I, II and III below more fully set out the preparation of the chloroacetic esters.

According to this invention there is provided a novel and useful derivative of 4-vinylcyclohexene by refluxing the aforesaid chloroacetate derived from 4-vinylcyclohexene with one to two moles of sodium thiocyanate employing water and acetone as solvents during the refluxing operation. Example IV more fully sets out this preparation. It is not possible to purify the product of the invention by distillation and for this reason no really significant physical properties can be given. However, it is clear from analysis of the product of the invention given in Example IV that it contains sulfur in an amount quite close to that theoretically expected.

It will be clear to the chemist that modification and variation are possible within the scope of the invention.

Thus, thiocyanates equivalent to sodium thiocyanate in the preparation can be used. In place of water and acetone there may be employed water and ethanol, methanol, dioxane, etc. Other closely related haloesters of 4-vinylcyclohexene can be used as starting materials in the preparation of the novel product of this invention.

Example I

The monochloroacetate derived from 4-vinylcyclohexene was prepared by dissolving 21.3 g. of boron trifluoride-diethyl ether complex in 94.5 grams of monochloroacetic acid and 250 ml. of chloroform. To this mixture at 50° C. was added dropwise 108 grams of 4-vinylcyclohexene over a period of 65 minutes. The mixture was heated at the same temperature for an additional three hours and was allowed to stand overnight at room temperature before the reaction mixture was separated. The yield of the monochloroacetate was 30.6%. The bismonochloroacetate of 4-vinylcyclohexene and polymer yield was 25.0% while the unreacted 4-vinylcyclohexene was 36.5%. The monochloroacetate of 4-vinylcyclohexene was characterized by a boiling range of 64–5° C. at 0.25 mm. Hg, $N_D^{20}$ 1.4816. The calculated chlorine analysis was Cl=17.50% while chlorine found in this sample was Cl=17.71%.

Example II

A second procedure was used for synthesizing the monochloroacetate. To a 500 ml. 3-neck flask fitted with a thermometer, reflux condenser, dropping funnel and mercury sealed stirrer was added 1 mol (130 ml.) of 4-vinylcyclohexene and 1 mol (94.5 g.) of chloroacetic acid. The mixture was heated to 100° C. and 28.2 g. (20 ml.) of 50% sulfuric acid was added dropwise over a period of 17 minutes. The reaction mixture was kept at the same temperature for an additional 11¾ hours. The product was cooled and diluted with diethyl ether and washed with sodium bicarbonate solution, dried, and distilled. The product consisted of 18.5% of recovered 4-vinylcyclohexene, 16.8% of monochloroacetate, 39.1% of bis-chloroacetate and oily polymer, and 32.4% residue.

Example III

In a second run carried out under similar conditions to those given above except that 2 mols of chloroacetic acid was used to 1 mol of 4-vinylcyclohexene and 0.054 mol of concentrated acid was used instead of 0.144 mol of 50% acid. After a reaction time of six hours the yield was 26.5% recovered 4-vinylcyclohexene, 27.2% monochloroacetate, 10.2% bis-chloroacetate and oil, and 25.2% residue.

When esterifying with chloroacetic acid some acylation takes place without the use of a mineral acid catalyst. However, we have found that better yields are obtained when a small amount of sulfuric acid, $BF_3$-diethyl ether complex, or $H_2SO_4$ and $BF_3$ are used as catalysts.

Example IV

A mixture of 226 g. (1.12 mols) of the chloroacetate derived from 4-vinylcyclohexene, B. P.

64.5° (0.3 mm.), $n_D^{20}$ 1.4816 121.5 g. (1.5 mols) of sodium thiocyanate, 80 ml. of water and 800 ml. of acetone was refluxed for 16 hours. The reaction mixture was poured into excess water and the organic layer separated. The aqueous layer was extracted with benzene, and the combined organic layer dried. The solvent was removed under vacuum leaving 242.5 g. (89.3%) of the thiocyanoacetate derived from 4-vinylcyclohexene. This material could not be distilled, even under 1 mm. pressure, without decomposition.

Calculated for $C_{11}H_{15}NO_2S$, S, 14.3%. Found, S, 12.8%; Cl, 0.1%.

As indicated, the product of the invention has use as an essential active ingredient in an insecticidal composition of matter. Thus, tested against the common housefly by the standard Peet-Grady method the following results were obtained using the crude thiocyanoacetate derivative dissolved, as a 5% by weight solution, in Deobase, a deodorized kerosene usually employed for insecticide sprays:

|  | 5% by wt. in Deobase | 10% by wt. in Deobase |
| --- | --- | --- |
| Total of flies | 689 | 1001 |
| Average per cent knockdown in 10 minutes | 98.9 | 96.9 |
| Grate designation | B | AA |
| O. T. I. difference | +0.6 | +27.4 |
| Actual kill of O. T. I | 63.8 | 68.3 |
| Total Kill of sample tested | 64.4 | 95.7 |
| Knockdown of O. T. I. in 10 minutes | 98.0 | 98.2 |

Thus, a novel and useful product has been set forth.

We claim:

1. The thiocyanoacetate derived from 4-vinylcyclohexene by esterifying 4-vinylcyclohexene with monochloroacetic acid, said esterification being effected at an elevated temperature in the presence of an acid type catalyst, reacting the ester product with at least an equivalent quantity of an alkali metal thiocyanate at an elevated temperature in the presence of a solvent, and separating the product from said solvent and any unreacted alkali metal thiocyanate.

2. A novel insecticidal composition comprising a carrier and the thiocyanoacetate derived from 4-vinylcyclohexene by esterifying 4-vinylcyclohexene with monochloroacetic acid, said esterification being effected at an elevated temperature in the presence of an acid type catalyst, reacting the ester product with at least an equivalent quantity of an alkali metal thiocyanate at an elevated temperature in the presence of a solvent, and separating the product from said solvent and any unreacted alkali metal thiocyanate.

3. The thiocyanoacetate derived from 4-vinylcyclohexene by esterifying 4-vinylcyclohexene with monochloroacetic acid, said esterification being effected at an elevated temperature in the presence of an acid type catalyst, reacting the ester product with from 1 to 2 moles of an alkali metal thiocyanate at an elevated temperature in the presence of a solvent, and separating the product from said solvent and any unreacted alkali metal thiocyanate.

HERBERT L. JOHNSON.
ARCHIBALD P. STUART.

REFERENCES CITED

The following references are of record in the file of this patent:

UNITED STATES PATENTS

| Number | Name | Date |
| --- | --- | --- |
| 2,209,184 | Borglin | July 23, 1940 |
| 2,239,080 | Coleman | Apr. 22, 1941 |
| 2,376,105 | Williams | May 15, 1945 |
| 2,394,583 | Bruson | Feb. 12, 1946 |
| 2,395,455 | Bruson | Feb. 26, 1946 |
| 2,409,329 | Williams | Oct. 15, 1946 |
| 2,412,799 | Bruson | Dec. 17, 1946 |
| 2,425,185 | Haury | Aug. 5, 1947 |